Figure 5:
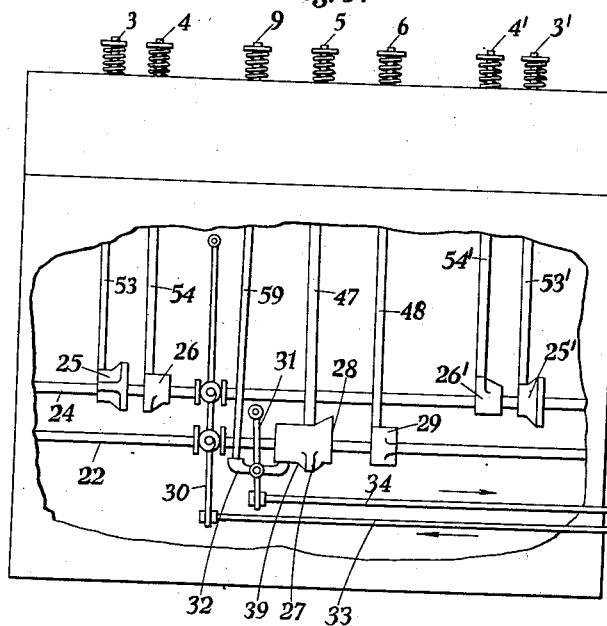

Nov. 5, 1940. C. W. P. HEYLANDT 2,220,764
TWO-STAGE INTERNAL COMBUSTION ENGINE
Filed June 2, 1937 2 Sheets-Sheet 1
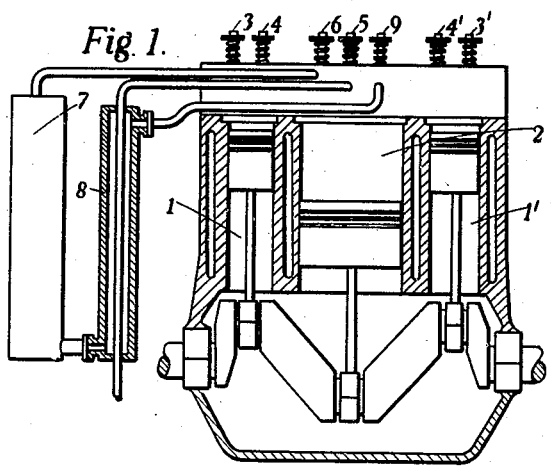
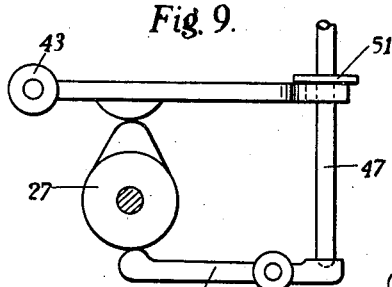
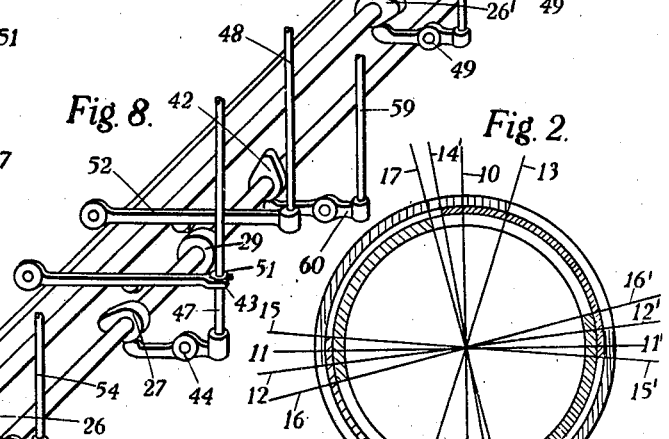
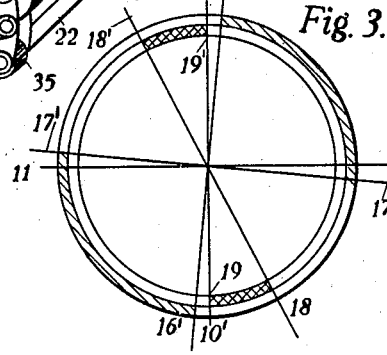
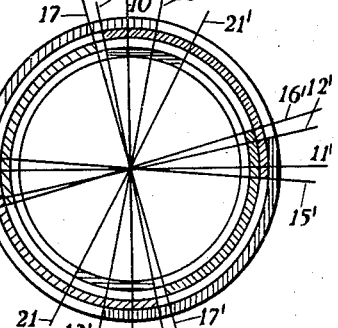
INVENTOR
Christian Wilhelm Paul Heylandt
BY
ATTORNEY Nov. 5, 1940.  C. W. P. HEYLANDT  2,220,764
TWO-STAGE INTERNAL COMBUSTION ENGINE
Filed June 2, 1937   2 Sheets-Sheet 2

INVENTOR
Christian Wilhelm Paul Heylandt
BY
F. P. McIntosh
ATTORNEY

Patented Nov. 5, 1940

2,220,764

UNITED STATES PATENT OFFICE 2,220,764

TWO-STAGE INTERNAL COMBUSTION ENGINE

Christian Wilhelm Paul Heylandt, Berlin-Britz, Germany

Application June 2, 1937, Serial No. 145,985
In Germany June 3, 1936

8 Claims. (Cl. 60—18)

This invention relates to two-stage internal combustion engines wherein the second stage is constituted by a reciprocating or rotary engine and of the kind employed for driving vehicles or installations requiring occasionally to be braked and accelerated.

In braking the load on the engine, considerable energy is dissipated and in accelerating the load, energy in excess of that normally available in the engine running at low speed may advantageously be employed. Desirably, part of the energy dissipated in braking may be stored and subsequently released for supplementing the normal output of the engine for the purpose of accelerating the load.

An object of the invention is to provide, in an internal combustion engine having a first, combustion and expansion stage and a second, expansion stage, the combination of a compressed air receiver, valve means in the second stage, means periodically actuating said valve means, a braking control member, means associated with said braking control member serving on operation of said member to displace the valve actuating means to cause compression of air in the second stage and delivery of the compressed air to said receiver, an acceleration control member, and means associated with said acceleration control member serving on operation thereof to cause periodic entry of compressed air from said receiver to the second stage to do work therein.

A further object of the invention is to provide, in association with the braking control member, means as aforesaid serving on operation of said member to displace cam means actuating the exhaust valve of the second stage to cause said exhaust valve to admit atmospheric air to the second stage and to actuate supplementary valve means controlling communication between the second stage and the compressed air receiver whereby the second stage supplies compressed air to said receiver during braking.

Yet another object of the invention is to provide in an internal combustion engine as aforesaid a heat exchanger wherein by means of the heat of the exhaust gases compressed air passing to the expansion stage during acceleration is heated.

Still further objects of the invention will be apparent from the following description with reference to the accompanying drawings, which illustrate by way of example some means of carrying out the invention.

Figure 6:
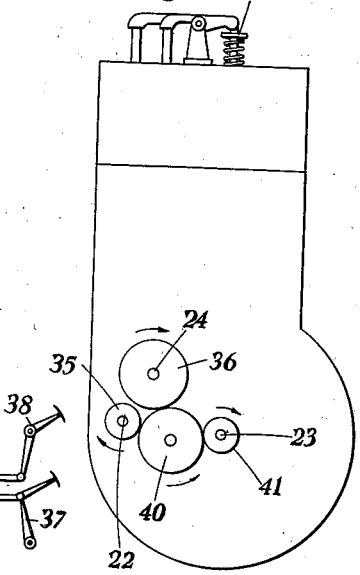
Figure 7:
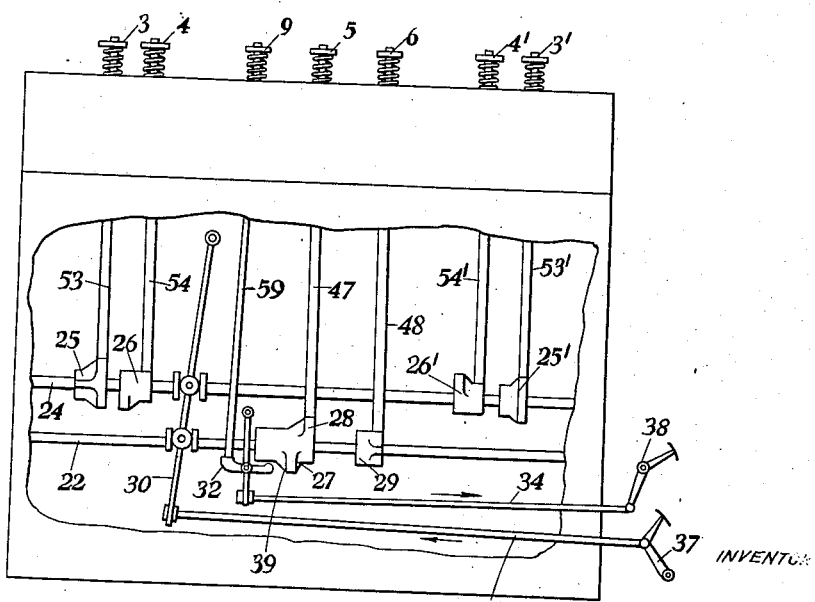

In the drawings, Fig. 1 is a diagrammatic side elevation, partly in section, of an engine, Figs. 2, 3 and 4 are valve timing diagrams respectively for normal running, for braking, and for acceleration, Fig. 5 is a side view of cam means for actuating the valves and control means associated therewith, Fig. 6 is an end elevation showing the camshaft drive, Fig. 7 is a side view corresponding to Fig. 5 and showing the camshafts displaced according to the invention, Fig. 8 is a perspective view showing another mode of displacing the camshafts, and Fig. 9 shows a detail of Fig. 8, on a larger scale.

The internal combustion engine shown in Fig. 1 comprises two first-stage combustion and expansion cylinders 1 and 1', working on a four-stroke cycle with their working strokes mutually spaced by 360°. A second-stage, two-stroke expansion cylinder 2 is disposed between the first-stage cylinders, the crank to which the piston in the cylinder 2 is connected being displaced by 180° from the cranks to which the pistons in the cylinders 1 and 1' are connected. The cylinders 1 and 1' have inlet valves 3 and 3' respectively, and transfer valves 4 and 4' respectively serving to control the passage of combustion products from said cylinders to the expansion cylinder 2. The latter has a valve 5 controlling communication between the cylinder 2 and the atmosphere and normally serving as an exhaust valve. A supplementary valve 6 controls communication from the cylinder 2 to a receiver 7, while another supplementary or boost valve 9 controls communication from the receiver 7 by way of a heat exchanger 8 (heated by exhaust gases from the cylinder 2), to the cylinder 2. The valves 3, 3', 4, 4', 5, 6 and 9 are actuated by cam means displaceable in a manner hereinafter described to effect various timings as required for normal running, for braking, and for acceleration.

In the valve timing diagram Fig. 2, for normal running, 10, 10' and 11, 11' denote respectively the lower and upper dead points of the pistons in the first-stage cylinders 1, 1' for a revolution of a camshaft running at half the crankshaft speed.

Considering the joint operation of the cylinders 1 and 2, under the control of the valves 3, 4 and 5, and referring to Fig. 2, shortly before the piston in cylinder 1 reaches the upper dead point 11, the inlet valve 3 opens at point 12 and remains open to the point 13 shortly after said piston reaches the lower dead point 10. From the point 13 to the next upper dead point 11' the charge introduced into cylinder 1 during the opening of valve 3 is compressed, and shortly before the point 11' ignition takes place. During the combustion stroke, expansion occurs until, shortly before the piston reaches the lower dead point 10', the transfer valve 4 opens at the point 14. While the piston in the cylinder 1 now rises, the combustion products are transferred into the cylinder 2, wherein the piston is falling, the valve 4 remaining open up to the point 15 shortly after the piston in cylinder 1 passes the upper dead point 11. Since the cross-sectional area of the cylinder 2 is about four times as large as that of the cylinder 1, during the transfer a further expansion of the combustion products takes place with the performance of external work. Shortly before the closing of the transfer valve 4 at the point 15, the outlet valve of the cylinder 2 opens at the point 16 to enable the exhaust of the expanded combustion products through the heat exchanger 8 to atmosphere. Moreover, the inlet valve 3 has again opened at the point 12, so that between the points 12 and 15 all three valves are opened simultaneously. Thus a complete revolution of the camshaft, corresponding to two revolutions of the crankshaft or the four-stroke cycle of the cylinder 1, is completed. The exhaust valve 5 of the cylinder 2 remains open up to the point 17.

For the joint operation of the cylinders 1' and 2, the valves 3', 4' and 5 are actuated on a similar cycle indicated by the primed points 12' to 17', which are displaced from the points 12 to 17 above mentioned by 180° of camshaft displacement corresponding to one revolution of the crankshaft. It is to be observed that the closing of the exhaust valve 5 occurs at the points 17 and 17', in each case shortly before the transfer valve 4' opens at the point 14' or the transfer valve 4 opens at the point 14.

When a braking effort is required, under the control of means to be described, the inlet valves 3, 3' and the transfer valves 4, 4' are immobilised. This immobilisation may be effected with the valves 3, 3' open and the valves 4, 4' closed, or all four valves may be closed, as desired. Under the same control means, the valves 5 and 6 are actuated in a sequence indicated by Fig. 3. The valve 5 is opened at the points 16, 16', shortly after the points 10 and 10', which represent the upper dead points of the piston in cylinder 2, i. e., at the commencement of each downward stroke of said piston, and remains open to the points 17, 17', shortly after the piston passes the lower dead points 11', 11, thereby serving as an inlet valve through which air is drawn into the cylinder 2. During each upward stroke, the piston compresses the induced air until at the points 18, 18' the valve 6 is opened, permitting the discharge of the compressed air to the receiver 7, said valve closing at the points 19, 19' corresponding to the upper dead points 10', 10' respectively. Thus during a braking effort the cylinder 2 acts as a two-stroke reciprocating compressor, absorbing work from the crankshaft.

When acceleration of the load is required, by means associated with the fuel control, the valve 6 is immobilised and the valves 3, 3', 4, 4', 5 and 9 are actuated in the sequence indicated in Fig. 4. This sequence corresponds to that described with reference to Fig. 2 in so far as the valves 3, 3', 4, 4' and 5 are concerned, with the addition of actuation of the valve 9 to open at the points 20, 20' and close at the points 21, 21', i. e., during the early part of each downward stroke of the piston in cylinder 2, for the admission of compressed air from the receiver 7 by way of the heat exchanger 8 to boost the cylinder 2. Evidently, exhaust gases from the cylinder 2 pass through the heat exchanger 8 under the control of valve 5 during such acceleration, so that compressed air admitted by the valve 9 is heated in its passage to the cylinder 2.

Figs. 5 to 7 show one means of controlling the valves according to the foregoing different sequences.

The valves 3, 3' and 4, 4' of the two cylinders 1, 1' are actuated during normal running through tappet rods 53, 53' and 54, 54' by cams 25, 25' and 26, 26' respectively on a camshaft 24, while the valve 5 of cylinder 2 is actuated through a tappet rod 47 by a cam 27 on a camshaft 22. Further, during normal running, as shown in Fig. 5, a tappet rod 48 associated with the valve 6 rides on a circular hub portion of a cam 29 on the camshaft 22, while a tappet rod 59 associated with the valve 9 is engaged by one end of a two-armed lever 32, the other end of which rides on a circular hub portion of the aforesaid cam 27. The camshaft 24, as shown in Fig. 6, is driven from the crankshaft 23 at half the angular speed of the latter through a train of gears 41, 40, 36, while the camshaft 22 is driven at crankshaft speed by a gear 35 in engagement with the gear 40.

By these means, the valves 3, 3', 4, 4' and 5 are actuated during normal running in the sequence described with reference to Fig. 2, the inlet and transfer valves opening once each in every two revolutions of the crankshaft 23, and the exhaust valve 5 being opened once in each revolution of the crankshaft 23 by the cam 27 rotating at crankshaft speed.

For a braking effort, the camshafts are displaceable by a lever 30 coupled by means of a rod 33 with a brake pedal 37, to the position shown in Fig. 7. In this position, the tappet rods 53, 53' ride up on enlarged circular portions of the cams 25, 25' so that the inlet valves are held constantly open, the tappet rods 54, 54' ride down upon circular hub portions of the cams 26, 26' so that the transfer valves are maintained constantly closed, and the tappet rod 47 of the valve 5 rides upon a cam 28 associated with and displaced about 180° from the cam 27, while the tappet rod 48 of the valve 6 rides upon the cam 29. Thereby, the valves 5 and 6 are actuated according to the cycle shown in Fig. 3, and the cylinder 2 acts as a two-stroke compressor.

For accelerating the engine when running under load, the camshafts are restored to the positions shown in Fig. 5 by the release of the brake pedal 37, and the lever 32 is caused, through a lever 31 coupled by a rod 34 with a fuel control pedal 38, to ride upon the cam 27. Thereby, the valves 3, 3', 4, 4', 5 and 9 are actuated according to the sequence shown in Fig. 4, that is for a compound combustion and expansion cycle with the addition of compressed air through the boost valve 9 at the commencement of each working stroke of the piston in cylinder 2.

Fig. 8 shows alternative means enabling the actuation of the valves according to the desired sequences of Figs. 2 to 4. The camshafts 22 and 24 are driven respectively at crankshaft speed and half crankshaft speed, but are mounted on at least one lever 30 turnable about the axis of the gear 40 by means of a tension member 33ª connected with the brake pedal 37, so that the gears 35 and 36 roll about the gear 40.

In the lower position of the camshafts, for normal running, tappet rods 53, 53', 54, 54' are actuated by rockers 49 engaging below the cams on shaft 24, and the tappet rod 47 is actuated by a rocker 44 engaging below cam 27 on shaft 22.

For a braking effort, the tension member 33ª is pulled upon actuation of the brake pedal 37 and displaces the lever 30 to raise the camshafts. Simultaneously, tension members 46 and 46' turn two forked levers 45, 45' into engagement with flanges 50, 50' on the tappet rods 53, 53' to lift said rods and thereby open and immobilise the inlet valves 3 and 3'. The lifting of the camshafts also displaces the cams 26, 26' from engagement with the rockers associated with the tappet rods 54, 54', so that the transfer valves 4, 4' are closed by their springs and thus immobilised, and further the cam 27 is lifted from engagement with rocker 44 to engagement with a rocker 43 which bears upon a flange 51 of the tappet rod 47 (see Fig. 9) while cam 29 is brought into engagement with a rocker 52 actuating the push rod 48, whereby the valves 5 and 6 are caused to operate in the sequence described with reference to Fig. 2 so that the cylinder 2 works as a two-stroke compressor.

The tappet 59 is actuated during normal running as well as during acceleration, in the lower position of the camshafts, by a cam 42 on the shaft 22, through a rocker 60, the admission of compressed air to the cylinder 2 being permitted under the periodic control of the valve 9 during acceleration by a shut-off element arranged in the boost conduit leading to said valve and actuable preferably with the accelerator control member 38, and prevented at all other times.

It is to be understood that the means displacing the camshaft is coupled with the brake control member in such a manner that when this member is first actuated, braking is effected by compression work in the cylinder 2, and that additional mechanical braking means, if provided, are rendered effective only by subsequent and further displacement of the braking control member.

The increased power made available according to the invention for accelerating a load from rest or from low speed renders it possible, for example in the case of a vehicle engine, to substitute a two-speed transmission for the three-speed or four-speed transmission commonly employed.

I claim:

1. In an internal combustion engine having a first, combustion and expansion stage and a second, expansion stage, the combination of a compressed air receiver, valve means in the second stage, means periodically actuating said valve means, a braking control member, means associated with said braking control member serving on operation of said member to displace the valve actuating means to cause compression of air in the second stage and delivery of the compressed air to said receiver, an acceleration control member, and means associated with said acceleration control member serving on operation thereof to cause periodic entry of compressed air from said receiver to the second stage to do work therein.

2. In an internal combustion engine, the combination of a first stage constituted by at least one combustion and expansion cylinder, a second, expansion stage, an inlet valve to said cylinder, a transfer valve controlling communication between said cylinder and the second stage, an exhaust valve in the second stage, cam means periodically actuating each of said valves, a compressed air receiver, supplementary valve means controlling communication between the second stage and said receiver, a braking control member, means associated with said braking control member serving on operation of said member to displace the cam means to cause said exhaust valve to admit atmospheric air to the second stage and to actuate said supplementary valve means as an exhaust valve whereby the second stage supplies compressed air to said receiver during braking, an acceleration control member, and means in association with said acceleration control member serving on operation thereof to cause periodic entry of compressed air from said receiver to the second stage to do work therein.

3. In a two-stage internal combustion engine, the combination of means as claimed in claim 1, with a heat exchanger heated by the engine exhaust gases and serving to heat the compressed air in its passage from the receiver to the second stage during acceleration.

4. In a two-stage internal combustion engine, the combination of means claimed in claim 2, with a conduit affording communication between the second stage and the atmosphere under the control of said exhaust valve, a heat exchanger surrounding said conduit, and a passage in said heat exchanger for heating compressed air passing from the receiver to the second stage to do work in the latter during acceleration.

5. In an internal combustion, reciprocating piston engine, the combination of a first stage constituted by two four-stroke combustion, and expansion cylinders the operating cycles of which are mutually displaced by 360°, a second stage constituted by a two-stroke expansion cylinder the crank of which is displaced by 180° from the cranks of said first-stage cylinders, an inlet valve to each of the first-stage cylinders, a transfer valve controlling communication between each of the first-stage cylinders and the second-stage cylinder, an exhaust valve controlling communication between the second-stage cylinder and atmosphere, a compressed air receiver, a supplementary outlet valve controlling communication from the second-stage cylinder to said receiver, a supplementary inlet valve controlling communication from said receiver to the second-stage cylinder, at least one camshaft, a braking control member, lever-linkage means associated with the braking control member serving on operation of said member to displace the camshaft axially, a plurality of cams on said camshaft, tappet rods bearing on said cams to actuate the valves, four of said cams serving normally to open and close the inlet and transfer valves of the first-stage cylinders once each in time sequence during two engine revolutions, said four cams having circular portions upon which the associated tappet rods ride to immobilise the inlet and transfer valves upon axial displacement of the camshaft, a fifth cam serving normally to open said exhaust valve during each upward stroke of the piston in the second-stage cylinder, a sixth cam adjacent the fifth cam upon which the associated tappet rod rides under displacement of the camshaft, said sixth cam serving alternatively to open the exhaust valve during every downward stroke of the piston in the second-stage cylinder, a seventh cam having a circular portion upon which the tappet rod associated with said supplementary outlet valve normally rides to immobilise said valve, said seventh cam serving upon displacement of the camshaft to open said supplementary outlet valve to afford communication from the second-stage cylinder to the receiver towards the end of each upward stroke of the piston in the second-stage cylinder, a circular portion on the fifth cam, a two-armed lever the ends of which bear respectively on the last-mentioned circular portion and the tappet rod associated with said supplementary inlet valve, means mounting said lever, an acceleration control member, and means connecting said mounting means to said acceleration control member, said mounting means and the lever mounted thereon being displaceable upon actuation of the acceleration control lever to cause one end of said lever to ride upon the fifth cam to admit compressed air from the receiver to the second-stage cylinder at the beginning of each downward stroke of the piston therein.

6. In an internal combustion, reciprocating piston engine, the combination of means claimed in claim 5, wherein the circular portions on the two cams serving normally to open and close the inlet valves of the first-stage cylinders have a radius greater than the maximum radius of said cams for holding said inlet valves open under operation of the braking control member.

7. In an internal combustion, reciprocating piston engine, the combination of a first stage constituted by two four-stroke combustion and expansion cylinders the operating cycles of which are mutually displaced by 360°, a second stage constituted by a two-stroke expansion cylinder the crank of which is displaced by 180° from the cranks of said first-stage cylinders, an inlet valve to each of the first-stage cylinders, a transfer valve controlling communication between each of the first-stage cylinders and the second-stage cylinder, an exhaust valve controlling communication between the second-stage cylinder and atmosphere, a compressed air receiver, a supplementary outlet valve controlling communication from the second-stage cylinder to said receiver, a boost conduit affording communication from said receiver to the second-stage cylinder, a boost valve controlling said conduit, at least one camshaft, a braking control member, a train of gears driving the camshaft, lever-linkage means associated with the braking control member serving on operation of said member to displace the camshaft parallel to itself about the axis of one of said train of gears, a tappet rod associated with each of said inlet, transfer and exhaust valves, a rocker bearing on each of said tappet rods, five cams on the camshaft disposed normally each to actuate one of said rockers, the displacement of the camshaft removing said cams from engagement with said rockers, a supplementary rocker engaging the tappet rod associated with the exhaust valve, said rocker being disposed for engagement by the exhaust valve actuating cam upon displacement of the cam shaft to open said valve during each downward stroke of the piston in the second-stage cylinder, a tappet rod actuating said supplementary outlet valve, a rocker associated with the last-mentioned tappet rod, a supplementary cam on the camshaft, the last mentioned rocker being disposed for engagement by said supplementary cam upon displacement of the camshaft to open said supplementary outlet valve to afford communication from the second-stage cylinder to the receiver towards the end of each upward stroke of the piston in the second-stage cylinder, a tappet rod actuating said boost valve, a rocker associated with the last-mentioned tappet rod, a further supplementary cam on the camshaft serving normally to engage the last-mentioned rocker to open the boost valve at the beginning of each downward stroke of the piston in the second-stage cylinder, an acceleration control member, and means normally closing the boost conduit, said means being associated with said acceleration control member and serving on operation thereof to permit entry of compressed air under the control of said supplementary inlet valve from the receiver to the second stage to do work therein.

8. In an internal combustion, reciprocating piston engine, the combination of means claimed in claim 7 with two additional levers, one engaging each of the tappet rods associated with an inlet valve, and linkage means associated with the braking control member to turn said levers for opening said inlet valves upon the operation of said braking control member.

CHRISTIAN WILHELM PAUL HEYLANDT.